(12) United States Patent
Pan et al.

(10) Patent No.: US 10,263,979 B2
(45) Date of Patent: Apr. 16, 2019

(54) IDENTIFICATION CODE GENERATING SYSTEM AND METHOD THEREOF USING VIRTUAL REALITY PROCESS

(71) Applicant: Chunghwa Telecom Co., Ltd., Yangmei, Taoyuan County (TW)

(72) Inventors: Yi-Tsung Pan, Yangmei (TW); Chi-Hao Li, Yangmei (TW); Yu-Ching Chen, Yangmei (TW); Xiao-Juan Zou, Yangmei (TW); Ching-Fen Tsai, Yangmei (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 196 days.

(21) Appl. No.: 15/178,162

(22) Filed: Jun. 9, 2016

(65) Prior Publication Data
US 2017/0155644 A1    Jun. 1, 2017

(30) Foreign Application Priority Data
Nov. 30, 2015  (TW) .............................. 104139856 A

(51) Int. Cl.
| | | |
|---|---|---|
| *G06F 7/04* | (2006.01) | |
| *H04L 9/32* | (2006.01) | |
| *G06F 21/00* | (2013.01) | |
| *H04L 29/06* | (2006.01) | |
| *G06T 19/00* | (2011.01) | |
| *H04B 1/3827* | (2015.01) | |

(52) U.S. Cl.
CPC ........ *H04L 63/0838* (2013.01); *G06T 19/006* (2013.01); *H04B 1/3827* (2013.01)

(58) Field of Classification Search
CPC .. H04L 63/0838; G06T 19/006; H04B 1/3827
USPC .................................. 726/6, 7; 713/168, 182
See application file for complete search history.

(56) References Cited

U.S. PATENT DOCUMENTS

| | | | | |
|---|---|---|---|---|
| 6,445,973 B1 * | 9/2002 | Sagasaki | .............. | G05B 19/408 700/169 |
| 2009/0254666 A1 * | 10/2009 | Agulnik | .............. | H04L 12/5692 709/228 |
| 2011/0074817 A1 * | 3/2011 | Shinoda | .................. | G06T 7/344 345/634 |
| 2012/0159615 A1 * | 6/2012 | Griffin | ...................... | G09C 5/00 726/19 |
| 2014/0068754 A1 * | 3/2014 | Burkill | .................... | G06F 21/36 726/18 |
| 2014/0115670 A1 * | 4/2014 | Barton | .................. | H04L 9/3228 726/4 |
| 2016/0123758 A1 * | 5/2016 | Benzaia | ................. | H04N 7/185 701/538 |

(Continued)

FOREIGN PATENT DOCUMENTS

TW             201002025 A      1/2010

*Primary Examiner* — Aravind K Moorthy
(74) *Attorney, Agent, or Firm* — JCIPRNET

(57) ABSTRACT

An identification code generating system and method thereof using a virtual reality process includes a first electronic device and a second electronic device. The first electronic device displays an identification frame with identification information. The second electronic device further acquires the identification frame by an image acquiring unit, and overlaps an overlapping frame on the identification frame so as to provide an identification code.

10 Claims, 4 Drawing Sheets

(56) References Cited

U.S. PATENT DOCUMENTS

2016/0142204 A1* 5/2016 Coleridge ............. H04L 9/0861
                                                    380/44
2016/0309085 A1* 10/2016 Ilic ....................... G06T 3/4038
2016/0342845 A1* 11/2016 Tien-Spalding ... G06K 9/00771
2017/0094190 A1* 3/2017 Melakari ............ H04N 5/23293

* cited by examiner

|   |   |   |   |   |   |
|---|---|---|---|---|---|
| Y | U | B | I | M | C |
| R | 4 | O | E | H | J |
| G | 1 | Q | Z | 6 | N |
| 2 | 0 | 1 | 1 | 9 | V |
Fig. 2
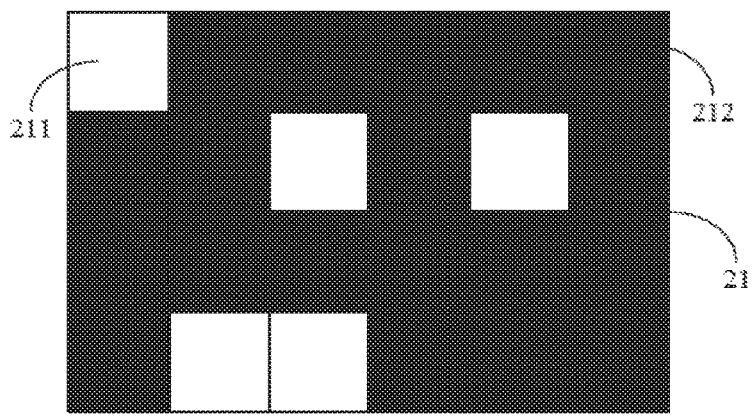
Fig. 3
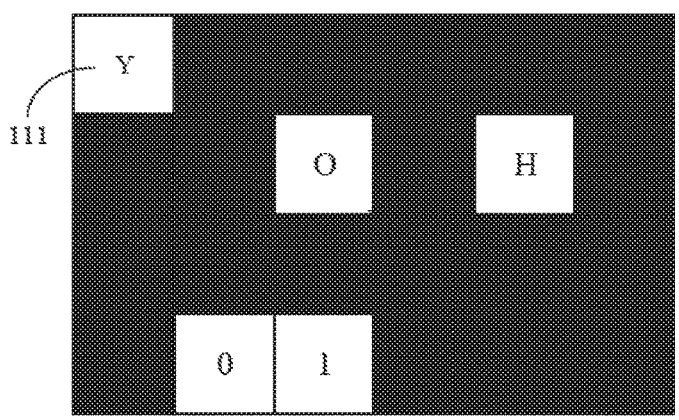
Fig. 4

IDENTIFICATION CODE GENERATING SYSTEM AND METHOD THEREOF USING VIRTUAL REALITY PROCESS

BACKGROUND OF THE INVENTION

This application claims priority benefit of TW Patent Application Ser. No. 104139856 filed Nov. 30, 2015 which is hereby incorporated herein by reference its entirety.

1. Field of the Invention

The present invention is related to an identification code generating technology. More particularly, the present invention is related to an identification code generating technology using a virtual reality process.

2. Description of the Prior Art

Different login systems usually apply a One Time Password, OTP, process to identify ID in a login terminal. In published patent application No. TW201002025, a solution of using a mobile phone to receive an OTP message for identification is disclosed. In that solution, after the identification requestor receives the OTP message, it will input the OTP into an identification receiver to finish the identification process. If a malicious third party embeds a message transmitting program in the mobile phone to hack the OTP message information, it is easy to cheat the identification requestor in order to improperly retrieve identification information.

The weakness of the aforementioned solution is that the identification code is only transmitted to one electric device, thus the security of the solution highly relies on the security level of that electric device. In other words, when the malicious third party conquers the electric device, the security of the solution will be demolished.

Thus, providing a method to improve the conventional security level of providing an identification code is a technical demand for current technologies.

SUMMARY OF THE INVENTION

To solve the aforementioned issues, one objective of the present invention is to provide an identification code generating solution using a virtual reality process.

To achieve the aforementioned objective, the present invention provides an identification code generating system using a virtual reality process. The system comprises a first electronic device and a second electronic device. The first electronic device is configured to display an identification frame with identification information. The second electronic device is configured to acquire the identification frame by an image acquiring unit, and overlap an overlapping frame on the identification frame so as to provide an identification code.

To achieve the aforementioned objective, the present invention provides an identification code generating method using a virtual reality process.

As aforementioned, the present invention applies an identification code generating system using a virtual reality process to overlap the identification frame with an overlapping frame to generate the identification code so as to enhance the access security level of the identification code.

BRIEF DESCRIPTION OF THE DRAWINGS

For a better understanding of the aforementioned embodiments of the invention as well as additional embodiments thereof, reference should be made to the Detailed Description of the Preferred Embodiments below, in conjunction with the following drawings in which like reference numerals refer to corresponding parts throughout the figures.

FIG. 2 shows the identification frame displayed on the first electronic device of FIG. 1;

FIG. 3 shows the overlapping frame displayed on the second electronic device of FIG. 1;

FIG. 4 shows the identification code displayed on the second electronic device of FIG. 1;

DETAILED DESCRIPTION OF THE PREFERRED EMBODIMENT

The following description is about embodiments of the present invention; however, it is not intended to limit the scope of the present invention.

Figure 1:
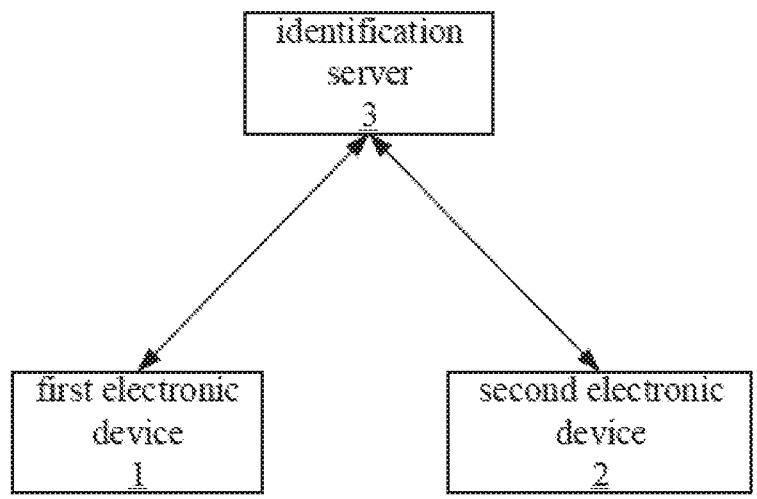
FIG. 1 shows an identification code generating system using a virtual reality process as a first embodiment of the present invention.

FIG. 1 shows the identification code generating system using a virtual reality process of the present invention as a first embodiment. The aforementioned system comprises a first electronic device 1, a second electronic device 2, and an identification server 3. When the user wants to login to a system requesting identification, the identification sever 3 will be triggered to respectively transmit the identification frame 11 with identification information to the first electronic device 1 and transmit the overlapping frame 21 to the second electronic device 2. The second electronic device 2 further acquires the identification frame 11 by an image acquiring unit (for example, a camera), and overlaps the overlapping frame 21 on the identification frame 11 so as to provide an identification code 111.

FIGS. 2 and 3 respectively show the identification frame 11 and overlapping frame 21 as examples. The identification frame 11 is a code table, and the overlapping frame 21 comprises at least one through portion 211 and at least one masking portion 212. As shown in FIG. 4, when the overlapping frame 21 overlaps the identification frame 11, the identification code 111 will be shown through the through portion 211 as {YOH01}.

In another embodiment, to enhance transmission security, the identification server 3 transmits the identification frame 11 and the overlapping frame 21 to the first electronic device 1 and the second electronic device 2, respectively, through two heterogeneous telecommunication networks to enhance security against a malicious third party hack.

Figure 5:
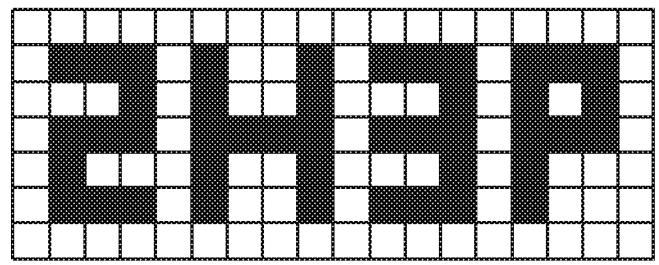
FIG. 5 shows an identification code frame of a second embodiment.
Figure 6:
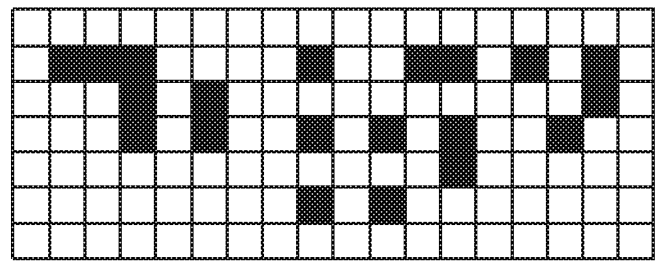
FIG. 6 shows an identification code frame of the second embodiment.
Figure 7:
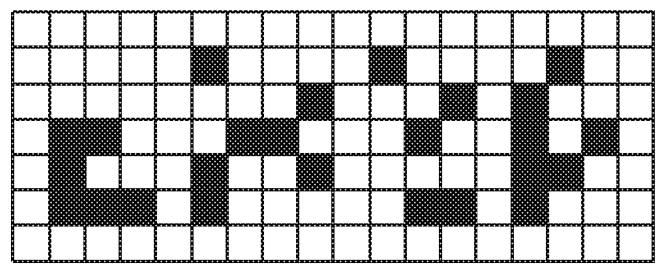
FIG. 7 shows an overlapping frame of the second embodiment.

The first electronic device 1 can be a computer, a portable electronic device (such as a smart phone or a tablet). The second electronic device can be a portable electronic device or a headset electronic device (such as a smart phone or a tablet). The first electronic device 1 comprises a communication unit (wireless or wireline unit), display unit, an I/O unit, memory unit, and a processor unit which is connected with the aforementioned units. The second electronic device 1 further comprises a communication unit (wireless or wireline unit), display unit, an I/O unit, an image acquiring unit, memory unit, and a processor unit which is connected with the aforementioned units. The identification server 3 is a computer server. In another embodiment, the identification frame 11 and the overlapping frame 21 have the discrete identification code 111, which can only be identified after overlapping. Taking FIG. 5 as an example, if the identification code 111 is {2H3P}, the identification frame 11 and overlapping frame 21 will dissociate the frame of FIG. 5 into the frames of FIG. 6 and FIG. 7. When the malicious third party retrieves a single figure, it is unable to identify the identification code 111.

Figure 8:
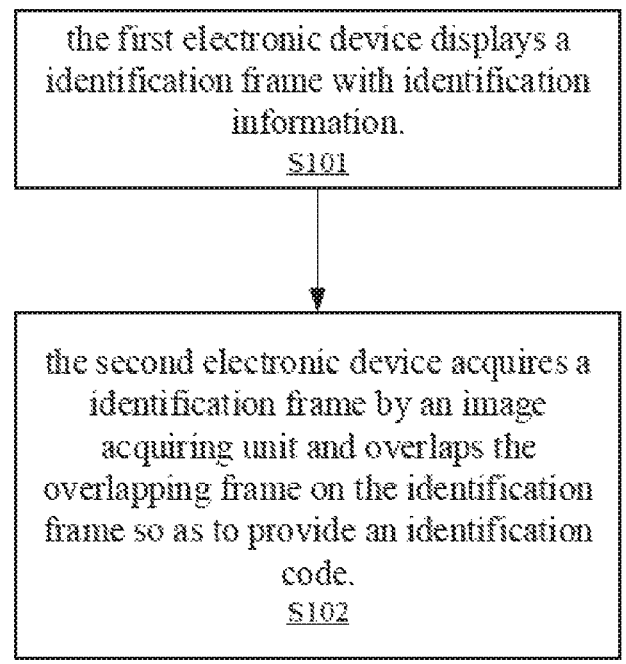
FIG. 8 shows a flow chart of a method for generating identification code using a virtual reality process of the present invention as a third embodiment.

FIG. 8 shows the identification code generating method using a virtual reality process of the present invention as another embodiment. The method comprises the steps of:

S101: enabling a first electronic device 1 to display an identification frame 11 with identification information.

S102: enabling a second electronic device 2 to acquire the identification frame 11 from an image acquiring unit, and configuring to overlap an overlapping frame 21 on the identification frame 11 so as to provide an identification code 111.

In another embodiment, the overlapping frame 21 comprises at least one through portion 211, and the second electronic device 2 displays the identification code 111 at the through portion 211 when the overlapping frame 21 overlaps the identification frame 11.

In another embodiment, an identification server 3 transmits the identification frame 11 and the overlapping frame 21 to the first electronic device 1 and the second electronic device 2 respectively through two heterogeneous telecommunications networks.

In another embodiment, the identification frame 11 and the overlapping frame 21 comprise discrete identification code respectively, and the identification cannot be identified unless the identification frame 11 and the overlapping frame 21 overlap to each other.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An identification code generating system using a virtual reality process, comprising:
a first electronic device, configured to display an identification frame with identification information;
a second electronic device, acquiring the identification frame by an image acquiring unit, and overlapping an overlapping frame on the identification frame so as to provide an identification code.

2. The system as claimed in claim 1, wherein the overlapping frame comprises at least one through portion, and the second electronic device displays the identification code at the through portion when the overlapping frame overlaps the identification frame.

3. The system as claimed in claim 1, further comprising an identification server, wherein the identification server transmits the identification frame and the overlapping frame to the first electronic device and the second electronic device, respectively, through two heterogeneous telecommunication networks.

4. The system as claimed in claim 1, wherein the second electronic device is a headset electronic device.

5. The system as claimed in claim 1, wherein the identification frame and the overlapping frame comprise discrete identification code, and the identification code cannot be identified unless the identification frame and the overlapping frame overlap each other.

6. A method for generating identification code using a virtual reality process, comprising the following steps:
enabling a first electronic device to display an identification frame with identification information;
enabling a second electronic device to acquire the identification frame from an image acquiring unit, and overlapping an overlapping frame on the identification frame so as to provide an identification code.

7. The method as claimed in claim 6, wherein the overlapping frame comprises at least one through portion, and the second electronic device displays the identification code at the through portion when the overlapping frame overlaps the identification frame.

8. The method as claimed in claim 6, further comprising an identification server, wherein the identification server transmits the identification frame and the overlapping frame to the first electronic device and the second electronic device, respectively, through two heterogeneous telecommunications networks.

9. The method as claimed in claim 6, wherein the second electronic device is a headset electronic device.

10. The method as claimed in claim 6, wherein the identification frame and the overlapping frame comprise discrete identification code, and the identification code cannot be identified unless the identification frame and the overlapping frame overlap each other.

* * * * *